(12) United States Patent  
Shigehara

(10) Patent No.: US 9,562,605 B2  
(45) Date of Patent: Feb. 7, 2017

(54) MOTOR CONTROL APPARATUS

(71) Applicant: TOYOTA JIDOSHA KABUSHIKI KAISHA, Toyota-shi, Aichi-ken (JP)

(72) Inventor: Eiichiro Shigehara, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/615,997

(22) Filed: Feb. 6, 2015

(65) Prior Publication Data

US 2015/0263656 A1  Sep. 17, 2015

(30) Foreign Application Priority Data

Mar. 14, 2014  (JP) .................................. 2014-052583

(51) Int. Cl.
| | | |
|---|---|---|
| G05B 13/00 | (2006.01) | |
| G05D 23/275 | (2006.01) | |
| F16H 61/00 | (2006.01) | |

(52) U.S. Cl.
CPC .............. *F16H 61/00* (2013.01); *Y02T 10/644* (2013.01); *Y02T 10/7275* (2013.01)

(58) Field of Classification Search
USPC ............................................. 318/400.04, 561
See application file for complete search history.

(56) References Cited

U.S. PATENT DOCUMENTS

| | | | | |
|---|---|---|---|---|
| 2008/0157705 A1* | 7/2008 | Sasaki | ................ | G01D 5/24428 318/564 |
| 2009/0091284 A1* | 4/2009 | Isobe | ..................... | H02P 25/08 318/561 |
| 2010/0237820 A1* | 9/2010 | Okuizumi | ............ | G01D 5/2449 318/632 |
| 2010/0327786 A1* | 12/2010 | Aoki | .................. | G01D 5/24452 318/400.04 |

FOREIGN PATENT DOCUMENTS

| | | |
|---|---|---|
| JP | S59-48160 A | 3/1984 |
| JP | 2005-110363 A | 4/2005 |
| JP | 2010-019825 A | 1/2010 |
| JP | 2010-096708 A | 4/2010 |
| JP | 2011-147254 A | 7/2011 |
| JP | 2013-072686 A | 4/2013 |

* cited by examiner

*Primary Examiner* — Eduardo Colon Santana  
*Assistant Examiner* — Cortez Cook  
(74) *Attorney, Agent, or Firm* — Oliff PLC

(57) ABSTRACT

A motor control apparatus controls a rotation of a motor based on a resolver signal that is output from a resolver and is in synchronization with a rotation angle of the motor. The motor control apparatus includes a control hardware block configured to correct the resolver signal; and a memory installed outside the control hardware block and configured to store error data of the resolver signal. The control hardware block includes an access part configured to read corresponding error data corresponding to a predetermined resolver rotation angle at which the resolver signal will be detected in the future from among the error data stored by (Continued)

the memory, a memory area configured to store the corresponding error data that is read by the access part, and a correction part configured to correct the detected resolver signal based on the corresponding error data stored in the data area.

9 Claims, 5 Drawing Sheets

US 9,562,605 B2

MOTOR CONTROL APPARATUS

BACKGROUND OF THE INVENTION

1. Field of the Invention

The present invention relates to a motor control apparatus, and, in particular, to a motor control apparatus which, during control of a rotation of a motor, corrects an error of a resolver signal that is output from a resolver.

2. Description of the Related Art

In the related art, an apparatus which corrects an error of a resolver signal that is output from a resolver is known (for example, see Japanese Laid-Open Patent Application No 2013-072686 (Patent Reference No. 1)). This apparatus is an electronic control unit (ECU) mainly including a microcomputer that includes a central processing unit (CPU) and a RAM (an external memory) inside. This apparatus learns a detected error of a resolver signal that is output from a resolver and executes error correction of the resolver signal based on the error learned value.

SUMMARY OF THE INVENTION

According to an aspect of the present invention, a motor control apparatus controls a rotation of a motor based on a resolver signal that is output from a resolver and is in synchronization with a rotation angle of the motor. The motor control apparatus includes a control hardware block configured to correct the resolver signal; and a memory installed outside the control hardware block and configured to store error data of the resolver signal. The control hardware block includes an access part configured to read corresponding error data corresponding to a predetermined resolver rotation angle at which the resolver signal will be detected in the future from among the error data stored by the memory, a memory area configured to store the corresponding error data that is read by the access part, and a correction part configured to correct the detected resolver signal based on the corresponding error data stored in the data area.

Other objects, features and advantages of the present invention will become more apparent from the following detailed description when read in conjunction with the accompanying drawings.

DETAILED DESCRIPTION OF THE EMBODIMENT

In the related art described above, assuming that error data learned by the ECU concerning a detection error of the resolver signal is stored by a RAM, the microcomputer accesses the RAM and reads the error data from the RAM for carrying out error correction of the resolver signal. However, in this configuration, a lot of time may be required by the microcomputer to read the error data from the RAM such that the timing of carrying out the error correction may be delayed with respect to the timing of detecting the resolver signal.

The embodiment of the present invention has been devised in consideration of this point, and an object of the embodiment is to provide a motor control apparatus by which it is possible to carry out error correction without causing a delay with respect to resolver signal detection timing by previously reading error data of a resolver signal from an external memory and transferring it into an internal data area before detecting the resolver signal.

Below, using the drawings, the specific embodiment of the motor control apparatus according to the present invention and the variants thereof will be described.

Figure 1:
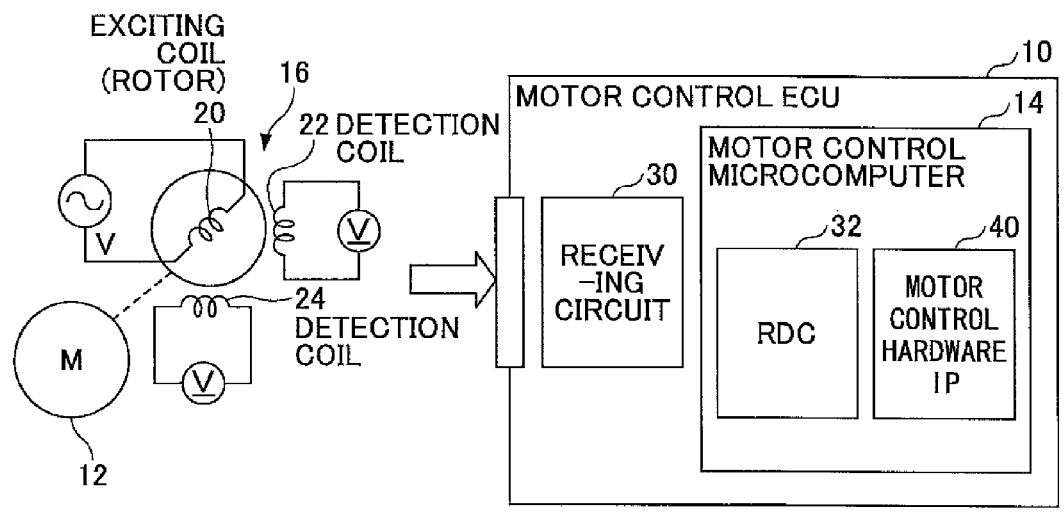
FIG. 1 is an entire configuration diagram of a system including a motor control apparatus according to one embodiment of the present invention.
Figure 2:
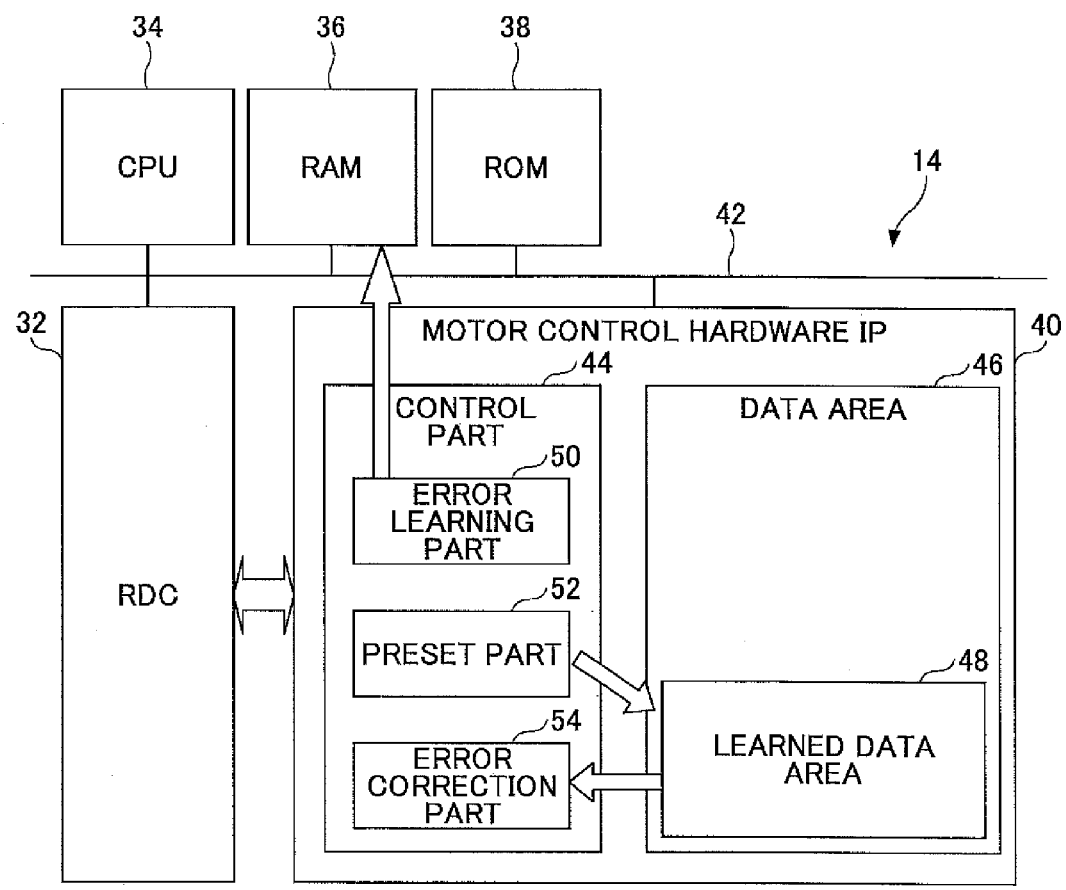
FIG. 2 is a configuration diagram of the motor control apparatus according to the present embodiment.
Figure 3:
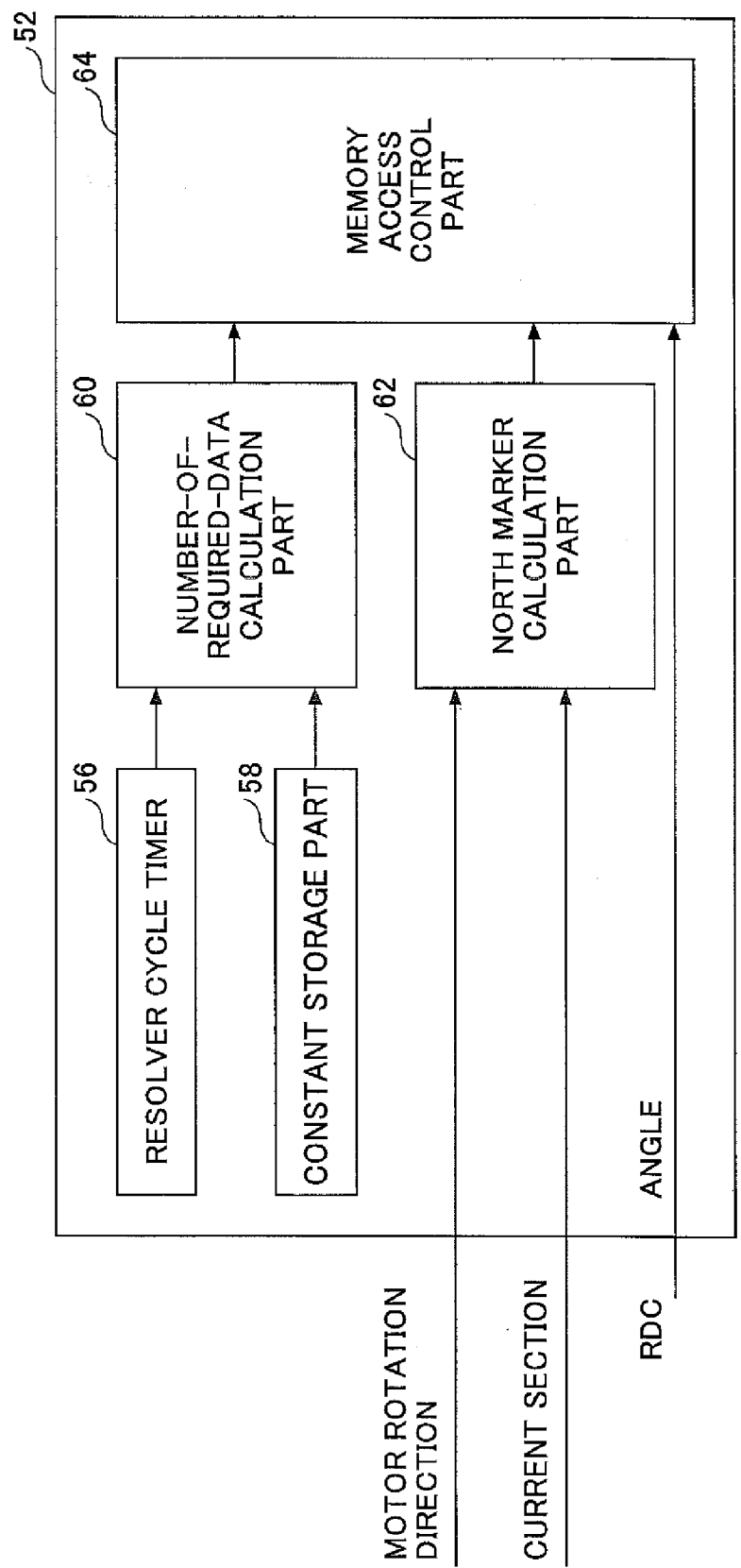
FIG. 3 is an internal configuration diagram of a preset part included in a motor control hardware IP included in the motor control apparatus according to the present embodiment.
Figure 4:
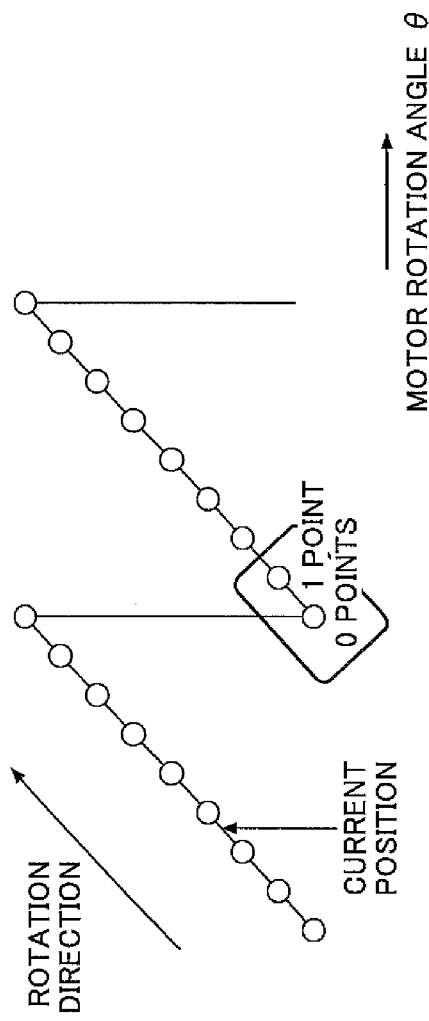
FIG. 4 is a diagram illustrating one example of error data of a resolver signal being previously transferred to a learned data area from a RAM in a variant of the embodiment.

FIG. 1 is an entire configuration diagram of a system including a motor control apparatus 10 according to the embodiment of the present invention. FIG. 2 is a configuration diagram of the motor control apparatus 10 according to the present embodiment. FIG. 3 is an internal configuration diagram of a preset part included in a motor control hardware IP included in the motor control apparatus 10 according to the present embodiment. FIG. 4 is a diagram illustrating a change in a resolver signal that is output by a resolver in the present embodiment.

The motor control apparatus 10 according to the present embodiment is, for example, an apparatus for controlling a rotation of a motor 12 mounted in a vehicle. The motor control apparatus 10 is an electronic control unit (ECU) mainly including a microcomputer 14.

The motor 12 is, for example, a power motor generating power to drive a vehicle such as a hybrid car or an electric car drivable by electric energy, an assist motor generating assist power for assisting a driver's steering operation in an electric power steering, or so. The motor 12 is, for example, a three-phase synchronous motor. Power generation in the motor 12 is implemented as a result of DC power of a secondary battery of nickel hydrogen, lithium ion or such being converted into AC power by an inverter and being supplied to the motor 12. The motor control apparatus 10 controls a rotation of the motor 12 by appropriately switching and driving the inverter depending on the rotation angle of the motor 12 according to an instruction of the microcomputer 14.

Near the shaft of the motor 12, a resolver 16 is installed. The resolver 16 is a sensor that outputs the resolver signal (analog signal) that is an electric signal in accordance with the rotation angle of the motor 12. The resolver 16 outputs a signal of n cycles while the motor 12 is rotated one turn with respect to the vehicle body. In other words, the resolver 16 is configured to output a signal which changes by an electrical angle 360° while the motor 12 is rotated a mechanical angle 360°/n. Thus, the resolver signal that is output by the resolver 16 is a signal such that the shaft multiple angle number is n, where n is a natural number.

The resolver 16 includes one exciting coil 20 and two detection coils 22 and 24. To the exciting coil 20, the motor control apparatus 10 supplies an excitation signal having a constant frequency. The detection coils 22 and 24 generate the resolver signal depending on the rotation angle of the motor 12 while the excitation signal is supplied to the exciting coil 20, and output the resolver signal to the motor control apparatus 10. The detection coils 22 and 24 are a sin coil and a cos coil extending in mutually orthogonal directions. For example, the detection coil 22 outputs a sine wave signal changing in its amplitude according to the rotation angle θ of the motor 12. The detection coil 24 outputs a cosine wave signal changing in its amplitude according to the rotation angle θ of the motor 12. The signal that is output by the detection coil 22 and the signal that is output by the detection coil 24 are mutually shifted in phase by the electrical angle 90°.

The motor control apparatus 10 includes the above-mentioned microcomputer 14 and a receiving circuit 30. The receiving circuit 30 is connected to the output terminals of the resolver 16. The receiving circuit 30 receives the resolver signal that is output by the resolver 16. The microcomputer 14 has a resolver digital converter (RDC) 32 connected with the receiving circuit 30. The resolver signal from the resolver 16 received by the receiving circuit 30 is supplied to the RDC 32. The RDC 32 converts the resolver signal supplied by the resolver 16 into digital data, i.e., "angle data".

Hereinafter, the rotation angle of the resolver 16 indicated by the angle data that is output by the RDC 32 will be referred to as a "resolver rotation angle θorg". The RDC 32 outputs, as the angle data of the resolver 16, an A-phase pulse signal according to the resolver rotation angle θorg, a B-phase pulse signal having an electrical angle 90° from the A-phase pulse signal and a reference angle signal (i.e., a north marker signal) indicating a reference angle (for example, the electrical angle 0°) of the resolver 16.

The microcomputer 14 also includes a Central Processing Unit (CPU) 34, a Random Access Memory (RAM) 36, a Read-Only Memory (ROM) 38 and a motor control hardware IP (Intellectual Property) 40. The CPU 34, the RAM 36, the ROM 38 and the motor control hardware IP 40 are connected to the RDC 32 via a bus 42 in the microcomputer 14.

The ROM 38 stores a control map, a control program and so forth. In the RAM 36, various data is written and readably stored which includes error data of the resolver signal required for controlling the motor 12 described later. The CPU 34 executes motor control according to the control map, the control program and the various data stored in the ROM 38 and the RAM 36 and the angle data that is output by the RDC 32.

The motor control hardware IP 40 is a hardware circuit block that dedicatedly executes motor control inside the microcomputer 14. The angle data that is output by the RDC 32 is supplied to the motor control hardware IP 40. The motor control hardware IP 40 includes a control part 44 and a data area 46. The control part 44 carries out a process required for motor control. The data area 46 temporarily stores data required for motor control.

The control part 44 includes an error learning part 50, a preset part 52 and an error correction part 54. The error learning part 50 learns, for each of the resolver rotation angles θorg (i.e., the resolver signals that are output by the resolver 16), an error with respect to its true value, based on the angle data of the resolver 16 supplied by the RDC 32. The error learning part 50 writes data of an error of the resolver rotation angle θorg ("error data") in the RAM 36 while accessing the RAM 36 via the bus 42, when learning the error of the resolver rotation angle θorg. Note that error data of the resolver rotation angle θorg that the error learning part 50 thus learns can be one for each angle previously determined.

The preset part 52 reads the error data written in the RAM 36 into the motor control hardware IP 40, as will be described later. The preset part 52 stores the error data read from the RAM 36 in a learned data area 48 included in the data area 46. The error correction part 54 reads the error data stored in the learned data area 48 that was learned in the past, and corrects the resolver signal that is output by the resolver 16 in the motor control hardware IP 40. The learned data area 48 is a dedicated data area storing the error data of the resolver rotation angle θorg required for error correction of the resolver signal in the motor control hardware IP 40.

The preset part 52 includes, specifically, as shown in FIG. 3, a resolver cycle timer 56, a constant storage part 58, a number-of-required-data calculation part 60, a north marker calculation part 62 and a memory access control part 64. The resolver cycle timer 56 measures an angular velocity that is a rotation angle change of the resolver 16 based on a change in the angle data of the resolver 16 from the RDC 32 and then, calculates a resolver cycle X that is a period of time required for the resolver 16 to rotate one turn in an electrical angle based on the angular velocity. The resolver cycle X is a dynamically changing parameter.

The constant storage part 58 stores constants required for calculating the number of data pieces of the error data to be previously transferred to the learned data area 48 of the data area 46 from the RAM 36. The constants stored in the constant storage part 58 are, specifically, a maximum value (i.e., a maximum transfer period of time) Tmax required for transferring the error data from the RAM 36 to the learned data area 48 of the data area 46; and the number M of data pieces per one turn to be used to learn the error of the resolver signal or correct the resolver signal while the resolver 16 is rotated one turn in electrical angle.

The number-of-required-data calculation part 60 is connected with the resolver cycle timer 56 and the constant storage part 58. The number-of-required-data calculation part 60 calculates the number C of data pieces required to be transferred previously from the RAM 36 to, the learned data area 48 of the data area 46, based on the data of the resolver cycle X calculated by the resolver cycle timer 56 and the maximum transfer time Tmax and the number M of required data pieces per one turn stored in the constant storage part 58.

For example, the number-of-required-data calculation part 60 calculates a correction cycle Y (=X/M) that is a period of time during which an error of the resolver signal is to be learned or the resolver signal is to be corrected, based on the resolver cycle X and the number M of required data pieces per one turn. Then, the number-of-required-data calculation part 60 calculates the number C of data pieces of the error data to be transferred based on the relation between the thus calculated cycle Y and the maximum transfer time Tmax. Specifically, assuming that the resolver cycle X is 160 μs, the number M of required data pieces per one turn is 16 and the maximum transfer time Tmax is 40 μs, the correction period Y is acquired as 10 (=160/16) μs. Therefore, the number C of data pieces required to be transferred previously from the RAM 36 to the learned data area 48 is set to be greater than or equal to "4 (=40/10) (for example, "5") from the relation between the thus obtained correction cycle Y=10 μs and the maximum transfer time Tmax=40 μs.

To the preset part 52, the data of the direction in which the motor 12 is currently rotated ("rotation direction") and the data of the rotation angle at which the resolver 16 is currently placed ("current position") are input from the resolver 16, which are detected based on the resolver signal from the resolver 16. The north marker calculation part 62 calculates the position of the reference angle of the shaft which the resolver 16 will subsequently reach (i.e., the position at which the RDC 32 is expected to subsequently output the north marker signal), based on the data of the rotation direction and the data of the current position that are thus input.

The memory access control part 64 is connected to the number-of-required-data calculation part 60 and the north marker calculation part 62. Also, the memory access control part 64 is connected to the RDC 32. The memory access control part 64 determines whether the current resolver rotation angle θorg corresponds to the timing of reading the error data from the RAM 36, based on the current resolver rotation angle θorg indicated by the angle data of the resolver 16 supplied by the RDC 32 and the number C of data pieces of the error data to be transferred previously from the RAM 36 to the learned data area 48 calculated by the number-of-required-data calculation part 60. Note that this timing of reading the error data is the timing ahead of the resolver rotation angle at which the resolver signal will be detected in the future (i.e., the resolver rotation angle corresponding to the error data to be read from the RAM 36) by the maximum transfer time Tmax (to be at least the resolver rotation angle difference corresponding to the number C of required data pieces) or more.

Then, when determining that the current resolver rotation angle θorg corresponds to the timing, the memory access control part 64 accesses the RAM 36 and reads the error data, from among all the error data written in the RAM 36, corresponding to the resolver rotation angle at which the resolver signal will be read in the future (specifically, ahead of the current time by the maximum transfer time Tmax or more). Then, the memory access control part 64 stores the thus read error data in the learned data area 48. Such a transfer of the error data by the memory access control part 64 from the RAM 36 to the learned data area 48 inside the motor control hardware IP 40 is carried out repetitiously along with a rotation of the motor 12.

Thus, in the above-described configuration of the motor control apparatus 10, it is possible to read some of all the error data stored in the RAM 36 (specifically, only the error data from the current time to the time ahead of the current time by the maximum transfer time Tmax or more in the current motor rotation direction) and store the thus read error data in the learned data area 48 of the data area 46 inside the motor control hardware IP 40.

Every time after receiving the resolver signal from the resolver 16, the error correction part 54 of the control part 44 reads, according to the current resolver rotation angle θorg based on the resolver signal, the error data corresponding to the current resolver rotation angle θorg from the learned data area 48 and corrects the resolver signal based on the thus read error data. Thus, the error data of the resolver signal stored in the learned data area 48 is read when the current resolver rotation angle θorg reaches the rotation angle corresponding to the same resolver signal and is used to correct the detected resolver signal.

Therefore, according to the present embodiment, for carrying out error correction of the resolver signal, it is not necessary to transfer all the error data stored in the RAM 36 to the learned data area 48 inside the motor control hardware IP 40 in a lump, and it is not necessary to store and keep, in the learned data area 48 inside the motor control hardware IP 40, all the error data same as all the error data stored in the RAM. As a result, according to the configuration of the present embodiment, in comparison to a configuration where all the error data is stored and kept in the learned data area 48 inside the motor control hardware IP 40, it is possible to reduce the number of data pieces to be stored and kept in the learned data area 48 inside the motor control hardware IP 40. Therefore, it is possible to reduce the cost per each microcomputer 14.

Further, in the present embodiment, it is not necessary to access the RAM 36 via the bus 42 when the motor control hardware IP 40 (specifically, the error correction part 54) reads the error data for carrying out error correction of the resolver signal. What is to be carried out is merely accessing the learned data area 48 of the data area inside the motor control hardware IP 40. Therefore, according to the present embodiment, it is possible to reduce the time required for reading the error data when the error correction part 54 of the motor control hardware IP 40 carries out error correction of the resolver signal. Thus, it is possible to carry out error correction of the resolver signal quickly after detecting it in high precision.

More specifically, according to the motor control apparatus 10 of the present embodiment, the error data of the resolver signal is previously read from the RAM 36 into the learned data area 48 inside the motor control hardware IP 40 before the same resolver signal is detected. Thus, it is possible to carry out error correction without a delay with respect to the resolver signal detection timing.

Note that, in the above-mentioned embodiment, the motor control hardware IP 40 is one example of a "control hardware block"; the RAM 36 is one example of a "memory"; the preset part 52 or the memory access control part 64 is one example of an "access part"; the data area 46 or the learned data area 48 is one example of a "data area"; the error correction part 54 is one example of a "correction part"; the resolver cycle timer 56 is one example of a "resolver cycle calculation part"; and the number-of-required-data calculation part 60 is one example of a "period-of-time changing part".

In the above-mentioned embodiment, the error data to be transferred previously by the preset part 52 inside the motor control hardware IP 40 from the RAM 36 to the learned data area 48 is the error data corresponding to the resolver rotation angle of a time when the resolver signal is detected the maximum transfer time Tmax or more ahead of the current time.

However, the present invention is not limited thereto. It is also possible that such error data is included corresponding to the resolver rotation angle at which the resolver signal is detected immediately after the position of the subsequent north marker signal being expected to be output calculated by the north marker calculation part 62 based on the motor rotation direction and the current position of the resolver 16. Note that it is also possible that this error data includes the error data (i.e., the data at the 0 points shown in FIG. 4) corresponding to the resolver rotation angle occurring immediately after the generation of the north marker signal and the error data (i.e., the data at the 1 point shown in FIG. 4) corresponding to the subsequent resolver rotation angle adjacent to the above-mentioned resolver rotation angle in the rotation direction.

In this variant, regularly during a rotation of the motor 12, the error data corresponding to the resolver rotation angle at which the resolver signal is detected immediately after the generation of the north marker first with respect to the current position of the resolver 16 in the motor rotation direction is read from the RAM 36 and is stored in the learned data area 48. Therefore, according to the variant, even when the resolver signal indicating the rotation angle of the resolver 16 has a steep angle jump, it is possible to carry out error correction of the resolver signal immediately after the generation of the subsequent north marker in high precision.

Figure 5:
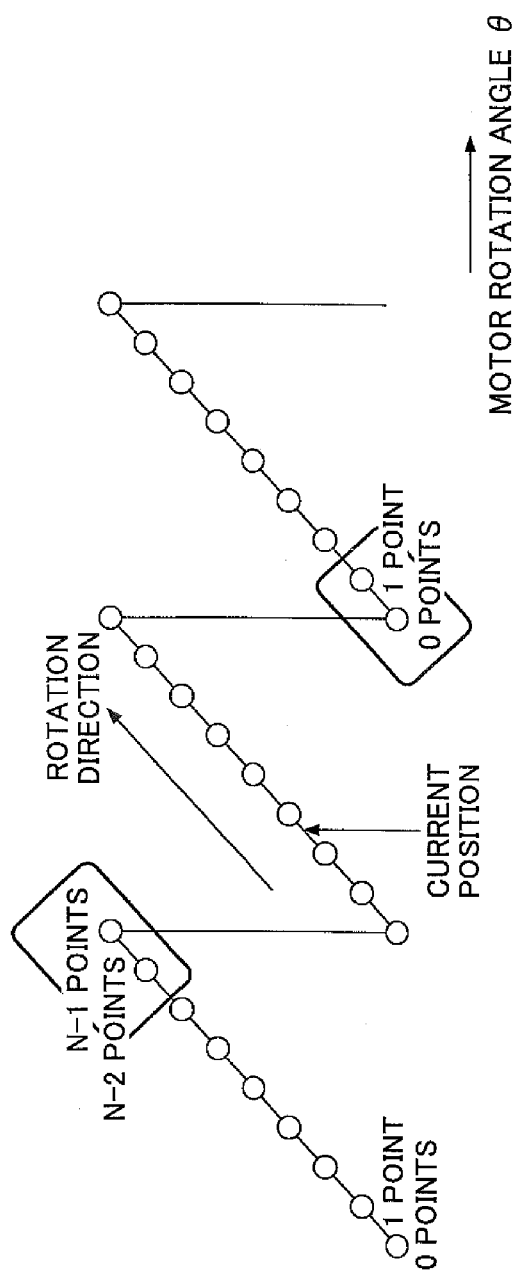
FIG. 5 is a diagram illustrating one example of error data of a resolver signal being previously transferred to a learned data area from a RAM in another variant of the embodiment.

Further, it is also possible that not only the error data corresponding to the resolver rotation angle immediately after the generation of the subsequent north marker in the current motor rotation direction from the current resolver rotation angle as in the above-mentioned variant, but also the error data corresponding to the resolver rotation angle immediately after the generation of the north marker in the direction reverse to the current motor rotation direction from the current resolver rotation angle, are included. Note that it is also possible that the error data to be thus added includes the error data (i.e., the data at the N−1 points shown in FIG. 5) corresponding to the resolver rotation angle occurring immediately after the generation of the north marker signal in the reverse rotation direction and the error data (i.e., the data at the N−2 points shown in FIG. 5) corresponding to the subsequent resolver rotation angle adjacent to the above-mentioned resolver rotation angle in the reverse rotation direction.

In this second variant, the north marker calculation part 62 calculates the position of the north marker signal being expected to be output first in the reverse rotation direction based on the motor rotation direction and the current position of the resolver 16. Then, the preset part 52 includes, as the error data to be transferred previously from the RAM 36 to the learned data area 48, the error data corresponding to the resolver rotation angle at which the resolver signal is detected immediately after the generation of this north marker signal in the reverse rotation angle. According to the second variant, regularly during a rotation of the motor 12, the error data corresponding to the resolver rotation angle at which the resolver signal is detected immediately after the generation of the north marker first with respect to the current position of the resolver 16 in the reverse rotation direction of the motor 12 is read from the RAM 36 and is stored in the learned data area 48. Therefore, according to the second variant, even when the rotation direction of the motor 12 is reversed, it is possible to carry out error correction of the resolver signal in high precision immediately after the generation of the subsequent north marker.

Figure 6:
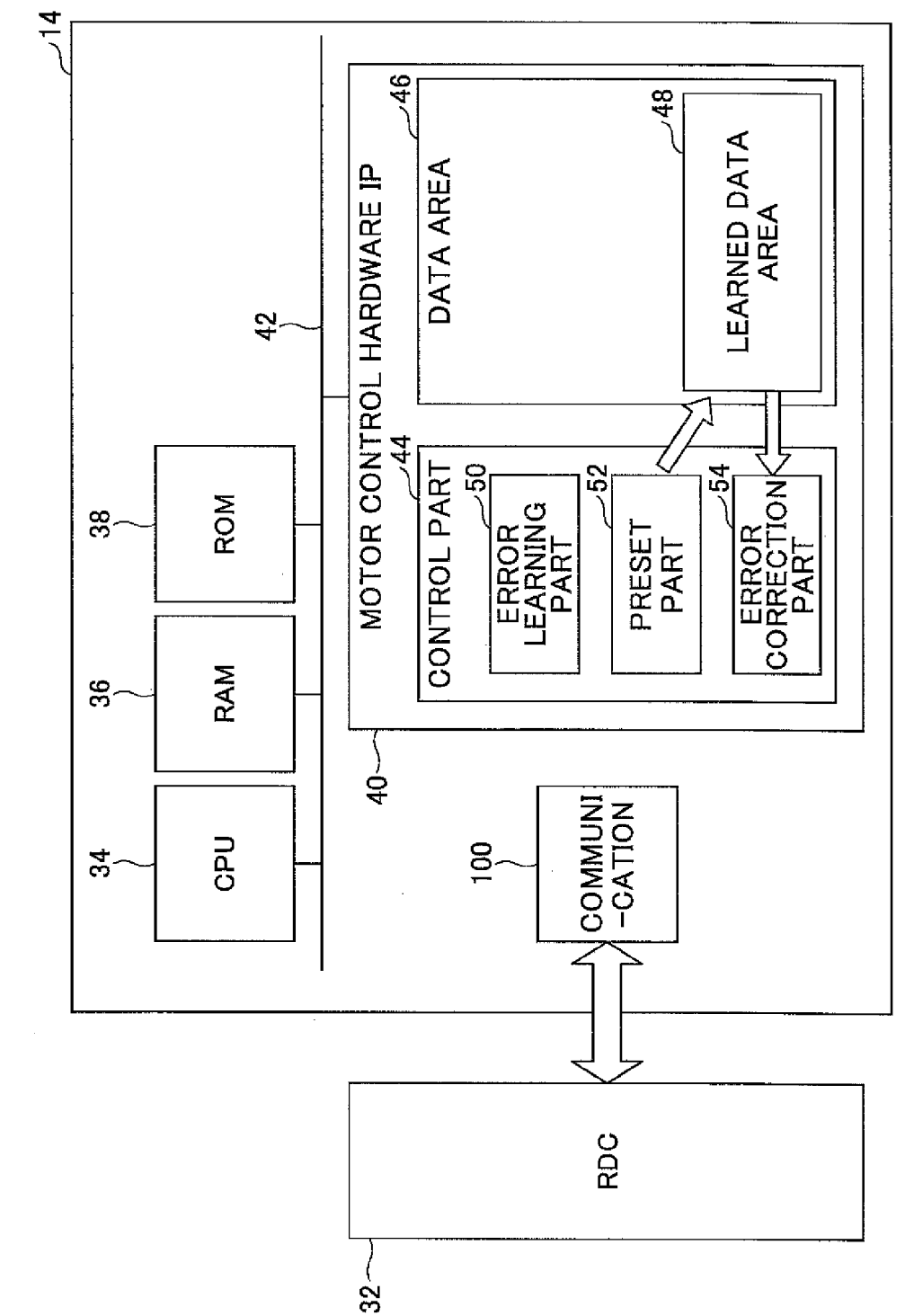
FIG. 6 is a configuration diagram of a motor control apparatus in another variant of the embodiment.

Further, in the above-mentioned embodiment, the RDC 32 has the microcomputer 14 inside. However, the present invention is not limited thereto. As shown in FIG. 6, it is also possible that the RDC 32 is installed externally to the microcomputer 14. In this case, it is possible that the RDC 32 is connected for communication with a communication part 100 installed inside the microcomputer 14.

Figure 7:
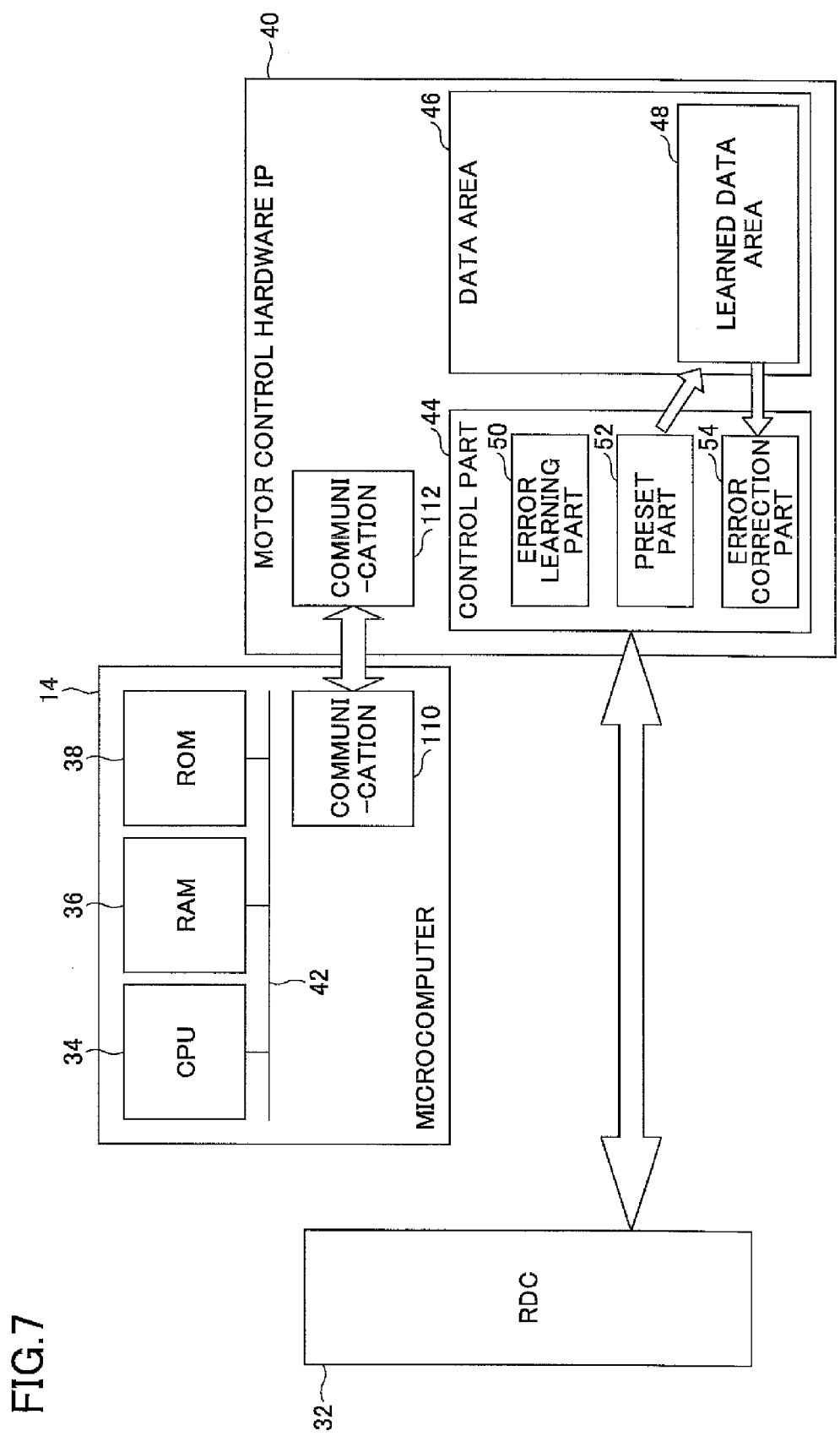
FIG. 7 is a configuration diagram of a motor control apparatus in yet another variant of the embodiment.

Further, in this variant, the motor control hardware IP 40 is installed inside the microcomputer 14. However, the present invention is not limited thereto. As shown in FIG. 7, it is also possible that the motor control hardware IP 40 is installed externally to the microcomputer 14. In this case, as shown in FIG. 7, it is possible that communication between the microcomputer 14 and the motor control hardware IP 40 is implemented as a result of a communication part 110 installed inside the microcomputer 14 and a communication part 112 installed inside the motor control hardware IP 40 are connected for communication therebetween.

According to the embodiment and the variants thereof of the present invention described above, it is possible to provide motor control apparatuses by each of which it is possible to carry out error correction without causing a delay with respect to resolver signal detection timing by previously reading error data of a resolver signal from an external memory and transferring it into an internal data area before detecting the resolver signal.

Thus, the motor control apparatuses have been described in the embodiment and its variants in detail. However, the present invention is not limited to the specific embodiments and the variants, and further variations, modifications and/or replacements can be made on the embodiment without departing from the scope of the present invention.

The present application is based on and claims the benefit of priority of Japanese Priority Application No. 2014-052583, filed on Mar. 14, 2014, the entire contents of which are hereby incorporated herein by reference.

What is claimed is:

1. A motor control apparatus which controls a rotation of a motor based on a resolver signal that is output from a resolver and is in synchronization with a rotation angle of the motor, the motor control apparatus comprising:
   a control hardware block configured to correct the resolver signal; and
   a memory installed outside the control hardware block and configured to store error data of the resolver signal, wherein
   the control hardware block includes
   an access part configured to read corresponding error data corresponding to a predetermined resolver rotation angle at which the resolver signal will be detected in the future from among the error data stored in the memory, the corresponding error data being the error data corresponding to the resolver rotation angle a predetermined period of time ahead of the current resolver rotation angle,
   a data area configured to store the corresponding error data that is read by the access part, and
   a correction part configured to correct the detected resolver signal based on the corresponding error data stored in the data area, and wherein
   the access part includes
   a resolver cycle calculation part configured to calculate a resolver cycle that is a period of time required for one turn of the resolver based on an angular velocity of the resolver, and
   a period-of-time changing part configured to change the predetermined period of time depending on the resolver cycle calculated by the resolver cycle calculation part.

2. The motor control apparatus as claimed in claim 1, wherein
   the period-of-time changing part is configured to change the predetermined period of time based on a relation between a correction cycle that is a period of time during which the resolver signal is to be corrected and is calculated based on the resolver cycle calculated by the resolver cycle calculation part and the number of data pieces per one turn to be used to correct the resolver signal during one turn of the resolver and a maximum transfer time required to transfer the corresponding error data to the data area from the memory.

3. The motor control apparatus as claimed in claim 2, wherein
   the period-of-time changing part is configured to change the predetermined period of time depending on the number of pieces of the corresponding error data to be stored in the data area and required to correct the error data during the maximum transfer time, the number of pieces of the corresponding error data being determined based on the relation.

4. The motor control apparatus as claimed in claim 1 wherein
the corresponding error data includes the error data corresponding to the resolver rotation angle at which the resolver signal is detected immediately after a reference angle signal is subsequently generated.

5. The motor control apparatus as claimed in claim 2 wherein
the corresponding error data includes the error data corresponding to the resolver rotation angle at which the resolver signal is detected immediately after a reference angle signal is subsequently generated.

6. The motor control apparatus as claimed in claim 3 wherein
the corresponding error data includes the error data corresponding to the resolver rotation angle at which the resolver signal is detected immediately after a reference angle signal is subsequently generated.

7. The motor control apparatus as claimed in claim 4, wherein
the corresponding error data includes the error data corresponding to the resolver rotation angle at which the resolver signal is detected immediately after generation of the reference angle signal subsequently in a rotation direction of the current resolver rotation angle, and error data corresponding to the resolver rotation angle at which the resolver signal is detected immediately after generation of the reference angle signal subsequently in a reverse rotation direction of the current resolver rotation angle.

8. The motor control apparatus as claimed in claim 5, wherein
the corresponding error data includes the error data corresponding to the resolver rotation angle at which the resolver signal is detected immediately after generation of the reference angle signal subsequently in a rotation direction of the current resolver rotation angle, and error data corresponding to the resolver rotation angle at which the resolver signal is detected immediately after generation of the reference angle signal subsequently in a reverse rotation direction of the current resolver rotation angle.

9. The motor control apparatus as claimed in claim 6, wherein
the corresponding error data includes the error data corresponding to the resolver rotation angle at which the resolver signal is detected immediately after generation of the reference angle signal subsequently in a rotation direction of the current resolver rotation angle, and error data corresponding to the resolver rotation angle at which the resolver signal is detected immediately after generation of the reference angle signal subsequently in a reverse rotation direction of the current resolver rotation angle.

* * * * *